No. 880,629. PATENTED MAR. 3, 1908.
H. C. CHRISTIANSON.
METHOD OF CRYSTALLIZING SUGAR.
APPLICATION FILED JUNE 14, 1907.
2 SHEETS—SHEET 1.
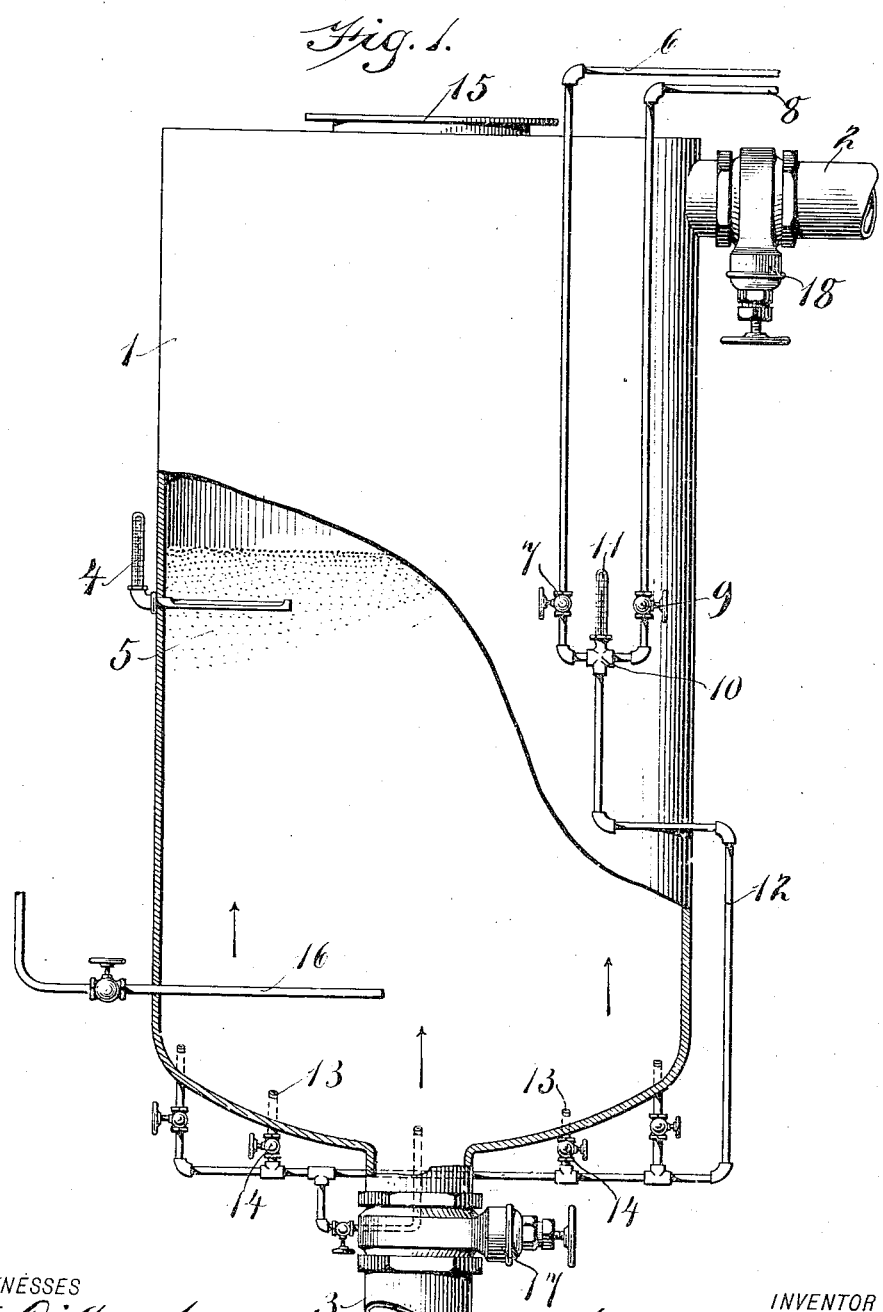

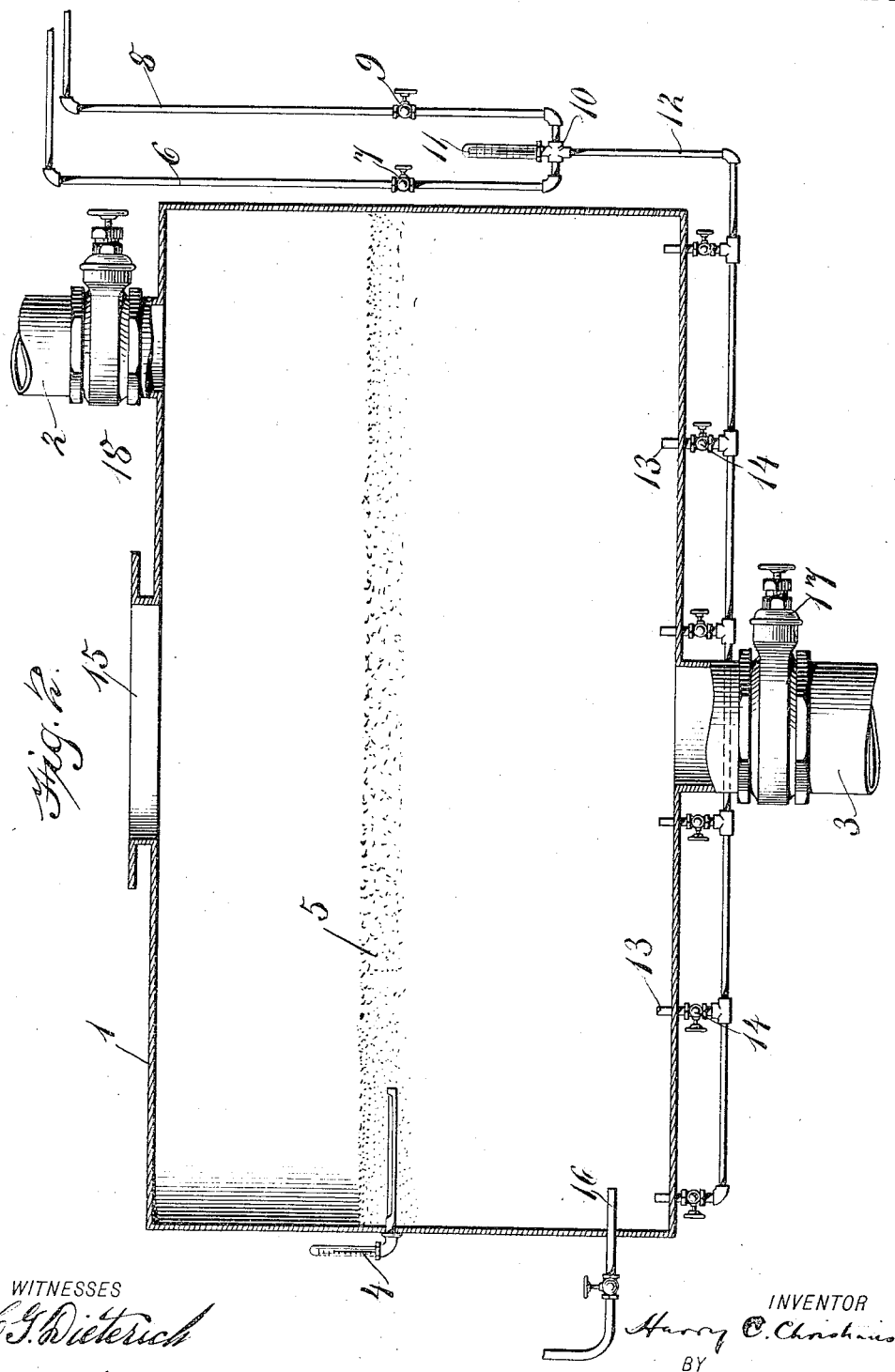

UNITED STATES PATENT

HARRY C. CHRISTIANSON, OF FANWOOD, NEW JERSEY.

METHOD OF CRYSTALLIZING SUGAR.

No. 880,629.

Specification of Letters Patent.

Patented Mar.

Application filed June 14, 1907. Serial No. 379,008.

*To all whom it may concern:*

Be it known that I, HARRY C. CHRISTIANSON, a citizen of the United States, resident of Fanwood, county of Union, and State of New Jersey, have invented certain new and useful Improvements in Methods for Crystallizing Sugar, of which the following is a specification.

Reference is hereby made to the accompanying drawings, of which

Figure 1 is a side elevation of a form of apparatus most suited for these purposes. Fig. 2 is a vertical sectional view of a modification thereof.

The reference numerals in both figures indicate corresponding parts.

It is well known that sugar can be only crystallized out of very low grade molasses or masse-cuite very slowly in a crystallizer, and only by means of agitating the molasses or masse-cuite during the crystallizing process. It is further known that the variation in temperature, that is a gradual decrease in temperature during the crystallizing process is also an important factor.

Various apparatus have been constructed by which the molasses is agitated and the temperature gradually decreased. These apparatus, however, have the disadvantage that they agitate the mass not slow enough, and that the temperature cannot be decreased uniformly throughout the whole mass to cause an even and uniform crystallization of the whole mass at the same time.

In the apparatus described hereinafter I have provided means by which the mass may be only slightly agitated and by which at the same time the temperature may be regulated in any desired degree.

In Fig. 1, 1 is a tank of any suitable size which may be charged with the molasses or masse-cuite through charging tube 2 at the upper end of the tank. At the bottom of the tank is provided discharge tube 3 with gate valve 17 for discharging the molasses after the treatment. At a suitable place is provided a thermometer 4 protruding into the masse-cuite 5 to indicate its temperature during the process. At the bottom of the tank is provided a suitable number of pipes 13 which protrude through the bottom into the tank and which are connected to one pipe 12 through which air of suitable low pressure and suitable temperature is supplied to these pipes. On each of these pipes protruding into the tank may be provided a valve 14. 6 is a pipe through which pressed air from a reservoir or compressor supplied at low temperature. 7 is a valve controlling the air supply through this pipe. 8 is a pipe through which compressed air at high temperature is supplied from any suitable means. 9 is a valve controlling the hot air supply. Both pipes 6 and 8 are united by the T-piece 10 to which the pipe 12 is connected. 11 is a thermometer which is fastened in T-piece 10 according to which the temperature of the air to be supplied to pipe 12 may be regulated by means of valves 7 and 9. 15 is an opening at the top of the tank which may be left open in order to let the air supplied by pipes 13 escape. The air in leaving pipes 13 at the bottom of the tank at low pressure will rise slowly in bubbles through the molasses or masse-cuite, thus keeping it constantly and only slightly agitated. The temperature of the air introduced into the mass is at the beginning of the process preferably the same as that of the molasses and while the process goes on gradually decreases a few degrees each day. This process may be continued for an indefinite time until substantially all the sugar has crystallized out of the molasses or masse-cuite. It is to be noticed that while the process is in operation, the gum and other impurities will be gradually carried to the surface, where owing to the languid character of the agitation they remain, separated from the slowly forming sugar crystals in the body of the liquid, and readily separated therefrom when the liquid is discharged to the centrifugals. The liquid being thoroughly mixed when it leaves the cooler can be discharged direct to the centrifugal without interposition of a mixer, thereby saving the cost of installation and operation of the latter.

At any suitable place a pipe 16 may be provided through which steam may be introduced before the tank is charged in order to heat it up to the temperature of the molasses to be introduced, and this pipe may also serve for supplying hot water for washing out the tank. While I have shown in Fig. 1 an apparatus for this crystallizing process in its preferred form, I do not wish to limit myself to this particular form, since the process may be carried out in the manner above described by any other form of tank, as for instance shown in the modification in Fig. 2, the fundamental idea consisting ing the molasses and ...f low pressure to rise ...s and in reducing the ...r gradually in order to ...ired by the crystallizing ...in my claim hereinafter ..."molasses", it may be stated ...is meant to designate any ...molasses, masse cuite or its equiva- ...:
method of crystallizing sugar from molasses, which comprises admitting air into the lower portion of the molasses at substantially the same temperature but slightly higher pressure than the molasses at said place of admission, and reducing the temperature of the air, before its admission, to the diminishing temperature of the molasses, as the crystallization progresses.

HARRY C. CHRISTIANSON.

Witnesses:
  HARRY E. KNIGHT,
  P. FRANK SONNEK.